United States Patent [19]

Ingber et al.

[11] 4,269,090

[45] May 26, 1981

[54] METHOD AND APPARATUS FOR MARKING MINIATURE TURNED PARTS

[75] Inventors: Lawrence K. Ingber, Boston; Francis J. Strangio, Watertown, both of Mass.

[73] Assignee: Swisstronics, Inc., Watertown, Mass.

[21] Appl. No.: 62,738

[22] Filed: Aug. 1, 1979

[51] Int. Cl.³ .......................... B23B 3/00; B31F 1/07; B23B 5/22
[52] U.S. Cl. ........................................ 82/1 C; 101/4; 101/3 R; 279/1 ME
[58] Field of Search ................ 279/1 R, 1 ME, 41 R; 101/3 R, 4, 28; 82/1 C

[56] References Cited

U.S. PATENT DOCUMENTS

| | | | |
|---|---|---|---|
| 441,822 | 12/1890 | Browning | 101/4 |
| 1,723,785 | 8/1929 | Johnson | 101/4 |
| 1,805,746 | 5/1931 | Warner | 101/4 X |
| 2,277,260 | 3/1942 | Sheffer | 279/1 ME |
| 2,939,386 | 6/1960 | Norris et al. | 101/28 |
| 3,768,401 | 10/1973 | Sahm et al. | 101/4 |

FOREIGN PATENT DOCUMENTS

297660  7/1932  Italy ............................................. 101/4

*Primary Examiner*—Harrison L. Hinson
*Attorney, Agent, or Firm*—Wolf, Greenfield & Sacks

[57] ABSTRACT

A miniature cylindrical turned part is marked with a selected indicia during the turning procedure by providing a collet, which holds the part, with an internal embossing stamp of the selected indicia.

2 Claims, 4 Drawing Figures

METHOD AND APPARATUS FOR MARKING MINIATURE TURNED PARTS

BACKGROUND AND SUMMARY OF THE INVENTION

This invention relates to a method and apparatus for embossing or imprinting a selected indicia on the surface of a miniature turned part such as, for example, a connector pin used in a multi-pin electrical connector. In general, the present invention is usable in connection with turned parts which are of the order of one quarter inch diameter or less such as electrical connector pins, small toggle switch levers, miniature pins or the like. Frequently, manufacturers of products which embody such parts may wish to mark the individual parts for a variety of reasons, sometimes to identify the manufacturer of the part or for other part identification purposes.

Usually, such miniature parts are turned in complex precision machinery having numerous tools and workholding devices which may be operated in a particular sequence and manner to manufacture the particular part. When it is desired to mark such a miniature part with a selected indicia, it has been a typical practice first to manufacture the part in the machinery and then, in a secondary and subsequent operation, pass the part through a separate stamping device which imprints the indicia on the part. This secondary operation adds significantly to the handling and cost of the part which, in the usual massive volumes in which such parts are made, can be very costly.

In accordance with the present invention, the part is marked or imprinted with the selected indicia while the part is being manufactured in the precision turning machinery. The present invention, thus, completely avoids any secondary stamping operation with a resultant and substantial economic saving. More specifically, at some point during the automatic manufacture of the part in the precision turning machinery, the part is gripped securely, usually by a collet. The collet may be mounted on a turret which is movable to feed or advance the workpiece to a subsequent tool in the machine to perform a subsequent operation. In accordance with the present invention, the part is marked directly by the collet which is provided with an embossing stamp formed directly on the work-clamping surface of the collet. Thus, when the collet grips the part during the normal sequence operation of the turning machine, that automatically marks the part and completely avoids the secondary stamping operation.

It is among the general objects of the invention to provide an improved method and apparatus for marking miniature turned parts with a selected indicia.

Another object of the invention is to provide a method and apparatus for marking such parts which completely avoids the necessity for a secondary stamping or imprinting operation.

Another object of the invention is to provide a method and apparatus of the type described which results in substantially lower manufacturing costs for the part.

Still another object of the invention is to provide a method and apparatus for imprinting or embossing a miniature turned part directly in the turning machinery and simultaneously during manufacture of the part.

DESCRIPTION OF THE DRAWINGS

The foregoing and other objects and advantages of the invention will be appreciated more fully from the following further description thereof, with reference to the accompanying drawings wherein.

DESCRIPTION OF THE PREFERRED EMBODIMENT

Figure 1:
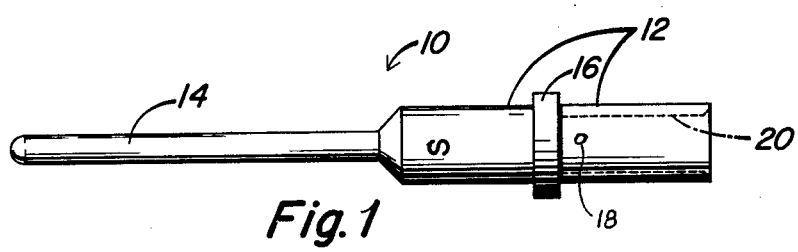
FIG. 1 is an enlarged illustration of a typical miniature part which is turned and formed in its entirety in precision turning machinery, and having an indicia embossed therein.

FIG. 1 shows, for example, a typical miniature turned part such as an electrical connector pin of the type which may be formed on the precision turning machinery described. For example, the pin 10 is formed from wire stock and is machined by one or more tools to the form shown. The machine typically may include drilling stations and other tools to form specific structural features of the pin, as may be desired. By way of example, the pin 10 shown may be turned to form a main rear portion 12 and a smaller diameter contact pin 14. The pin may be machined to define a mounting collar 16 on the main body 12 and other machining operations may be performed, such as drilling of a transverse hole 18 and drilling of a socket 20 in the main body 12, the socket 20 being intended to receive the end of a wire.

By way of further illustrative example, the pin 10 may be of the order of $\frac{3}{4}''$ long with main body diameter of approximately 1/16''.

As mentioned, often it is desirable to mark or imprint the turned part with a suitable indicia, indicated for example, by the letter S embossed on the main body 12 of the pin 10 in FIG. 1. The indicia may be desirable for any of a variety of purposes, such as imprinting a trademark or trade designation or for the purpose of other part identification which may be desirable under the circumstances. The typical prior practice has been first to manufacture the part in the turning machine and then to run the part through a stamping machine to emboss the indicia. As mentioned, this secondary embossing operation requires additional equipment and adds to the time required to manufacture the complete part, including the embossing. Such secondary operations are expensive and can add up to two cents to the cost of each part. Where a single production run of such parts can result in the manufacture of millions of such parts, the cumulative cost can be very substantial.

In accordance with the present invention, the additional secondary step of embossing the indicia on the part is completely omitted. This is achieved by providing one of the workpiece holders in the machine, such as a collet (shown in FIGS. 2-4) with an embossing element on a surface of the collet which grips the workpiece, at least at some stage during the manufacturing operation in the turning machine. The collet, indicated generally at 22 is mounted in the machine and at some stage during the manufacture of the part, will receive and clamp the part as indicated in phantom at 10' in FIG. 2. The collet 22 is generally cylindrical and is provided with a longitudinally extending slot 24 which may be considered as defining a pair of collet sections 26 which can be urged toward each other to effect a clamp on the part. The front end of the collet is provided with a bore 28 which is dimensioned so that it may receive the part. The collet sections 26 are urged together by a collar (not shown) which cooperates with conically-shaped surfaces 30 on the sections 26. At least one such collet typically is used in connection with the manufacture of the part in the precision turning machine. Typically, the workpiece will be inserted into the bore of the collar 28 after the part has been partly manufactured. After the collet sections 26 have been urged together to grip the workpiece, the collet (which may be mounted to a movable support such as a rotatable turret) holds the workpiece and advances it to a subsequent station in the machine to perform additional machine operations.

Figure 2:
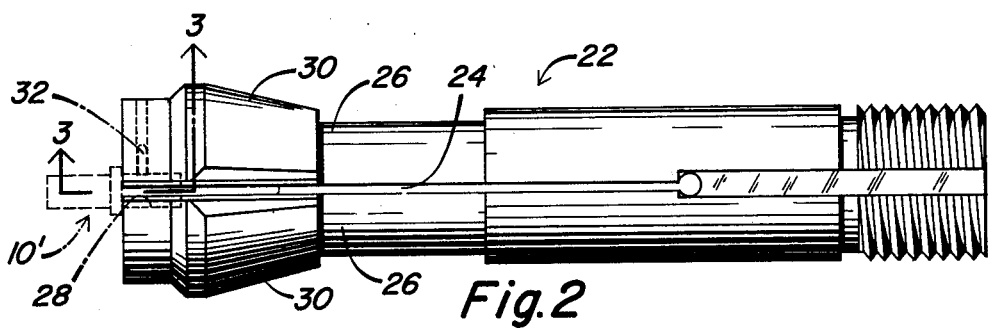
FIG. 2 is an illustration of a typical work-gripping collet which is used frequently in precision turning machinery of the type used to manufacture parts such as those shown in FIG. 1.
Figure 3:
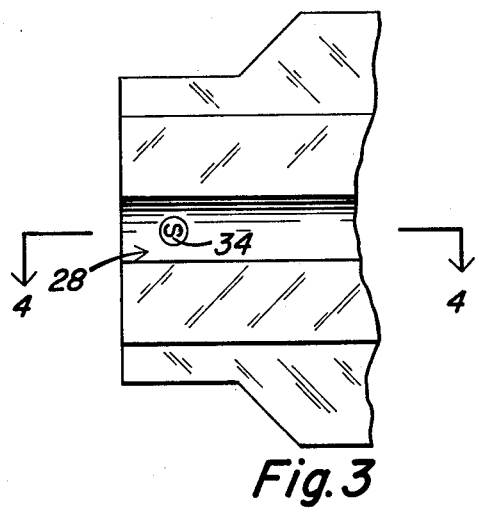
FIG. 3 is a sectional illustration of the collet seen along the line 3—3 of FIG. 2 and showing the embossing surface of the collet.
Figure 4:
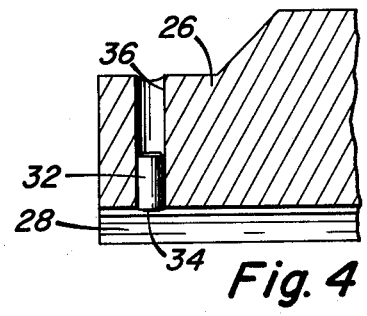
FIG. 4 is a sectional illustration of the collet as seen along the line 4—4 of FIG. 3.

In accordance with the present invention, one of the fingers of the collet is provided with a stamp, exposed at the inner surface of the bore 28. When the collet is clamped about the workpiece, the stamp embosses on the part whatever indicia the stamp may have. As shown in FIGS. 2-4, the stamp may take the form of an insert 32 having raised indicia (preferably hardened) indicated at 34. The stamp 32 may be in the form of a small cylinder of comparatively hard metal which is pressfitted into a hole 36 formed through one of the collet sections 26, to an extent such that the raised indicia 34 project slightly beyond the surface of the collet bore 28.

From the foregoing, it will be appreciated that when the turned part is gripped by the collet 22 in the normal sequence of operations in the machine the indicia will be imprinted automatically on the surface of the workpiece, thus completely avoiding any necessity for expensive secondary stamping operations.

It should be understood that the foregoing description of the invention is intended merely to be illustrative thereof and that other embodiments and modifications may be apparent to those skilled in the art without departing from its spirit.

Having thus described the invention, what we desire to claim and secure by Letters Patent is:

1. A method for simultaneously machining a part to a predetermined configuration and embossing the part with a selected indicia, in a precision turning machine having tools for turning the part to a predetermined configuration and supplemental tools located at different work stations for performing secondary operations on the workpiece, said machine further including workpiece holding means adapted to grip the workpiece and transfer it to a subsequent work station in the machine, the method comprising:

simultaneously embossing the workpiece with a selected indicia during the operating cycle of the turning machine by providing a stamp bearing the indicia in the workpiece holder at a location which will emboss the indicia on the workpiece as the workpiece holder grips the work piece.

2. In a machine for precision turning of a miniature cylindrical workpiece, the machine including a workpiece holder adapted to grip the workpiece at least during part of the operating cycle of the machine, the improvement comprising, in combination:

said workpiece holder comprising a collet having a pair of sections adapted to grip the workpiece by a pair of opposed cylindrical gripping surfaces;

one of the collet sections being formed with a pole which opens into one of the cylindrical workpiece gripping surfaces of the collet;

embossing means comprising a cylindrical insert of hardened metal and having raised indicia formed on an end thereof, said cylinder being press-fitted into the hole in the collet section to an extent in which the indicia projects slightly beyond the cylindrical surface of the collet whereby when the collet grips the cylindrical miniature workpiece, the indicia will be embossed simultaneously on the cylindrical surface of the workpiece.

* * * * *